(12) United States Patent
Maynard

(10) Patent No.: US 7,640,890 B1
(45) Date of Patent: Jan. 5, 2010

(54) PET DOOR PROTECTION APPARATUS

(76) Inventor: Raymond F. Maynard, 7 Bayview Ter., Hampton Bays, NY (US) 11946

( * ) Notice: Subject to any disclaimer, the term of this patent is extended or adjusted under 35 U.S.C. 154(b) by 138 days.

(21) Appl. No.: 12/101,980

(22) Filed: Apr. 12, 2008

(51) Int. Cl.
*A01K 1/02* (2006.01)
*A01K 1/035* (2006.01)

(52) U.S. Cl. .................. 119/484; 119/485; 119/499

(58) Field of Classification Search .......... 119/406, 119/407, 484, 485, 482, 474, 498, 499, 501, 119/843, 847, 849; *A01K 1/02, 1/03, 1/35, A01K 31/00; E06B 7/28*
See application file for complete search history.

(56) References Cited

U.S. PATENT DOCUMENTS

| 1,455,105 | A | * | 5/1923 | Butcher | 119/491 |
| 2,276,403 | A | * | 3/1942 | Lukes | 119/437 |
| 3,091,221 | A | | 5/1963 | Worm | |
| 4,788,934 | A | | 12/1988 | Fetter | |
| 4,995,336 | A | | 2/1991 | Deemer et al. | |
| D322,394 | S | | 12/1991 | Grandesso | |
| 5,649,500 | A | * | 7/1997 | Klavemann et al. | 119/452 |
| 2005/0050833 | A1 | | 3/2005 | Spray | |
| 2006/0042558 | A1 | | 3/2006 | Stephens | |
| 2006/0118059 | A1 | | 6/2006 | Turner | |
| 2007/0186866 | A1 | * | 8/2007 | Shibles et al. | 119/484 |

\* cited by examiner

*Primary Examiner*—Son T Nguyen
*Assistant Examiner*—Marisa Conlon
(74) *Attorney, Agent, or Firm*—Crossley Patent Law; Mark A. Crossley

(57) ABSTRACT

A pet door protection apparatus for movable placement adjacent to an existing pet door, the collapsible apparatus having a first end and an open second end, the base having an adjustment plate and mechanism for adjusting the height of the interior floor, which is fitted atop the adjustment plate. The apparatus further provides a transparent side panel removably and vertically fitted within each groove of the interior base, each of an opposed pair of transparent roof panels hingedly attached to one of the side panels, respectively, the roof panels further hingedly attached to each other, a pair of opposed transparent triangular roof end panels vertically fitted between the roof panels, a protective cap fitted atop the hinged attachment of the roof panels, and a strip anchor with a plurality of weighted flexible transparent strips selectively fitted to the first end of the side panels.

5 Claims, 5 Drawing Sheets

PET DOOR PROTECTION APPARATUS

BACKGROUND OF THE INVENTION

Pet doors are a useful means for pets to enter and exit an indoor facility, while at the same time attempting to resist the invasion of unwanted creatures, people, and inclement weather. Pet doors have suffered from inclement weather, however, due to the nature of the rubberized flaps which allow the pet's entrance and exit. Winds, rain and snow can easily enter the flaps. Some devices and adaptations of pet doors have been proposed which are highly exclusive, and therefore not useful to many pets. Some devices are exclusive to the point of negating a pet's use of the pet door device. Most of these devices are also attached to the pet door or to the doorway which houses the pet door, not an always desirable adaptation for the indoor facility structure. What is needed is an apparatus which forms a removably placed vestibule adjacent to a typical pet door. The apparatus should not discourage pet use, and therefore is ideally transparent. The apparatus should not require a significant learning curve for the pet. Further, the apparatus should be collapsible. The apparatus should also be height adjustable in order to best align with a given pet door. The present apparatus provides these problem solutions.

FIELD OF THE INVENTION

The pet door protection apparatus relates to pet doors and more especially to a pet door protection apparatus which shields a pet door and a pet.

SUMMARY OF THE INVENTION

The general purpose of the pet door protection apparatus, described subsequently in greater detail, is to provide a pet door protection apparatus which has many novel features that result in an improved pet door protection apparatus which is not anticipated, rendered obvious, suggested, or even implied by prior art, either alone or in combination thereof.

To attain this, the pet door protection apparatus comprises a majority of transparent components which encourage a pet to remain within, as desired, and encourage pet use. The apparatus is collapsible in order to aid transport or storage. The apparatus is easily collapsed and erected. The base and adjustment plate mechanism provides for best alignment with a given pet door, in a basic fashion. The weighted transparent flexible strips provide an effective weather deterrent while also encouraging pet use.

Comfort material on the interior base provides warmth and comfort. The apparatus is available in various sizes to accommodate an individual pet's needs. Plastics and other synthetic materials are used for lightweight and for inexpensive production and sale. The apparatus is removably positioned independently of any other structure. An alternative embodiment substitutes a hingedly-affixed rectangular door for the flexible strips.

Thus has been broadly outlined the more important features of the improved pet door protection apparatus so that the detailed description thereof that follows may be better understood and in order that the present contribution to the art may be better appreciated.

An object of the pet door protection apparatus is to prevent inclement weather conditions from opening or invading a pet door.

Another object of the pet door protection apparatus is to provide collapsibility.

A further object of the pet door protection apparatus is to provide for height adjustment of one end of the apparatus to align the apparatus with a structure's pet door.

An added object of the pet door protection apparatus is to provide transparency for a majority of the apparatus.

And, an object of the pet door protection apparatus is to reduce learning curves for a pet's use of the apparatus.

These together with additional objects, features and advantages of the improved pet door protection apparatus will be readily apparent to those of ordinary skill in the art upon reading the following detailed description of presently preferred, but nonetheless illustrative, embodiments of the improved pet door protection apparatus when taken in conjunction with the accompanying drawings.

In this respect, before explaining the current embodiments of the improved pet door protection apparatus in detail, it is to be understood that the pet door protection apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved pet door protection apparatus. It is therefore important that the claims be regarded as including such equivalent constructions insofar as they do not depart from the spirit and scope of the pet door protection apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the pet door protection apparatus generally designated by the reference number 10 will be described.

Figure 1:
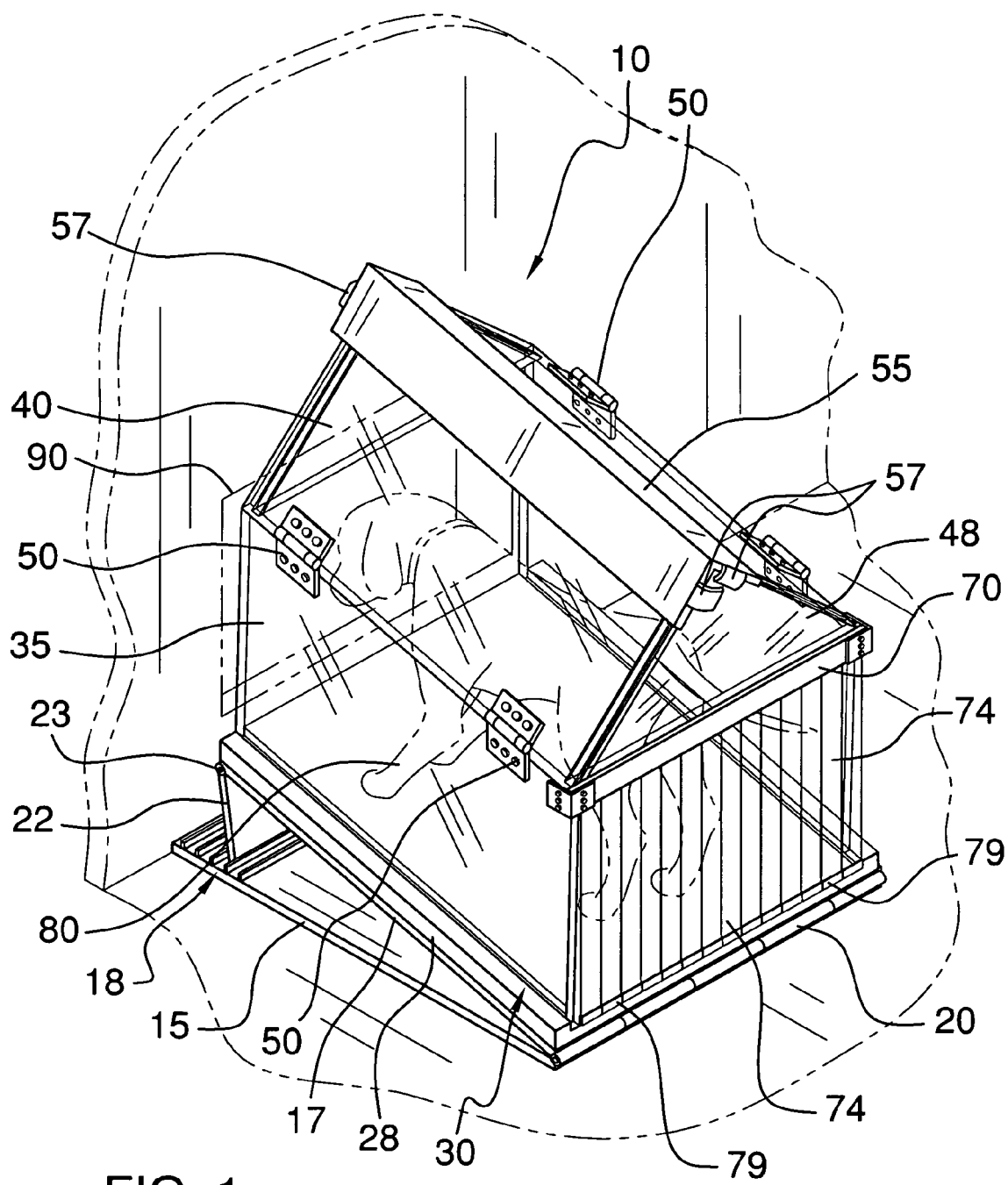
FIG. 1 is a perspective view of the apparatus in use without cover material covering the interior floor.
Figure 4:
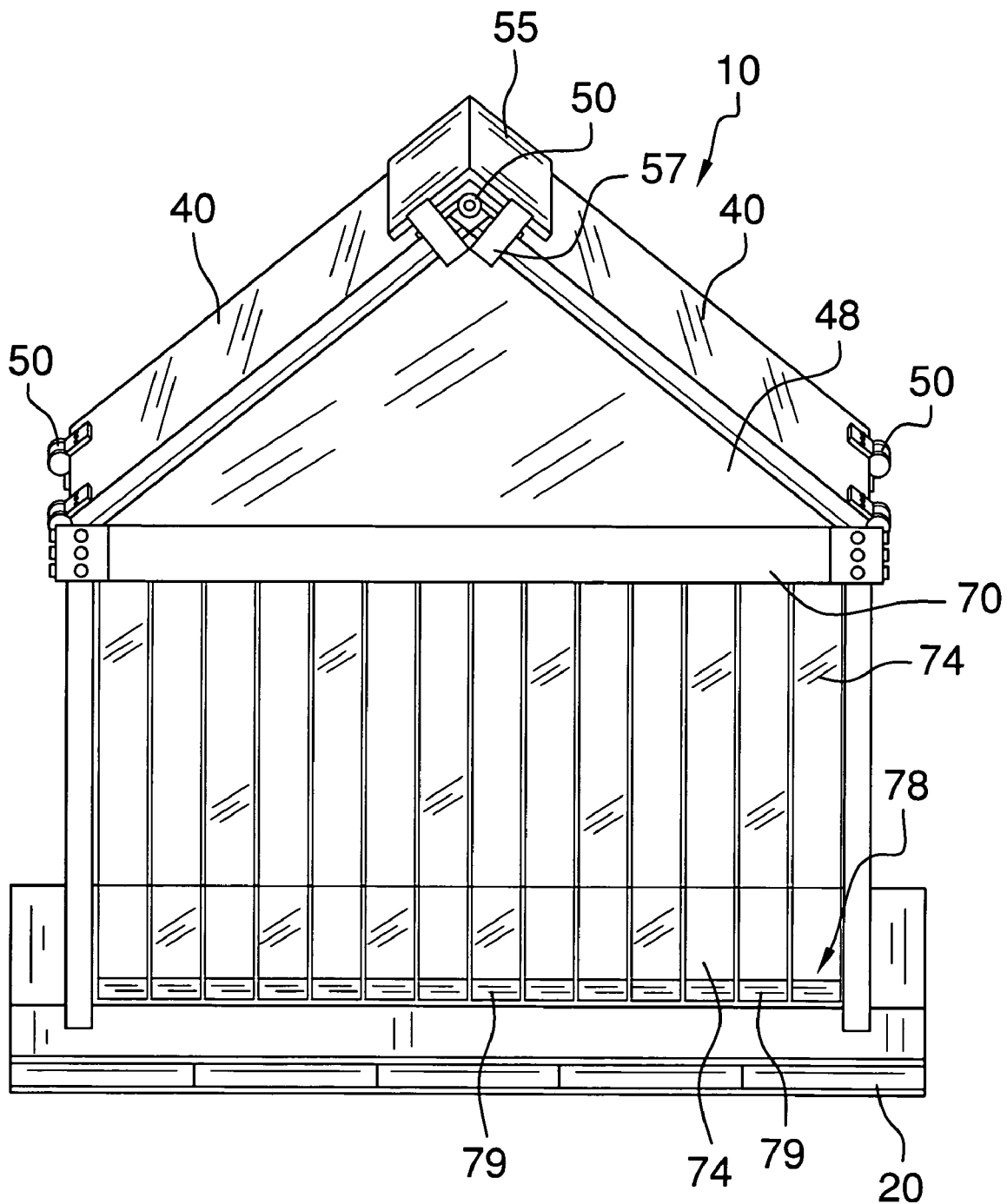
FIG. 4 is a perspective end view.

Referring to FIGS. 1 and 4, the collapsible pet door protection apparatus 10 is for movable placement adjacent to a pet door 90, without need of attachment of the apparatus 10 to any given structure. The apparatus 10 has a first end 12 and a second end 13. The apparatus 10 second end 13 is open and, as illustrated in FIG. 1, is positioned closely to the pet door 90 in order to shield the pet door 90 and a pet 80 from inclement weather conditions such as wind, rain and snow, for example. Transparent side panels 35, transparent roof panels 40, and transparent roof end panels 48, along with a plurality of transparent flexible strips 74 also provide shelter for a pet 80, but also allow the pet 80 to comfortably observe outdoor activities and events. Each flexible strip 74 has a weight 79 disposed at the strip's bottom end 78 to prevent wind and snow entry into the apparatus 10 which may also cause the pet door 90 to blow open.

Figure 2:
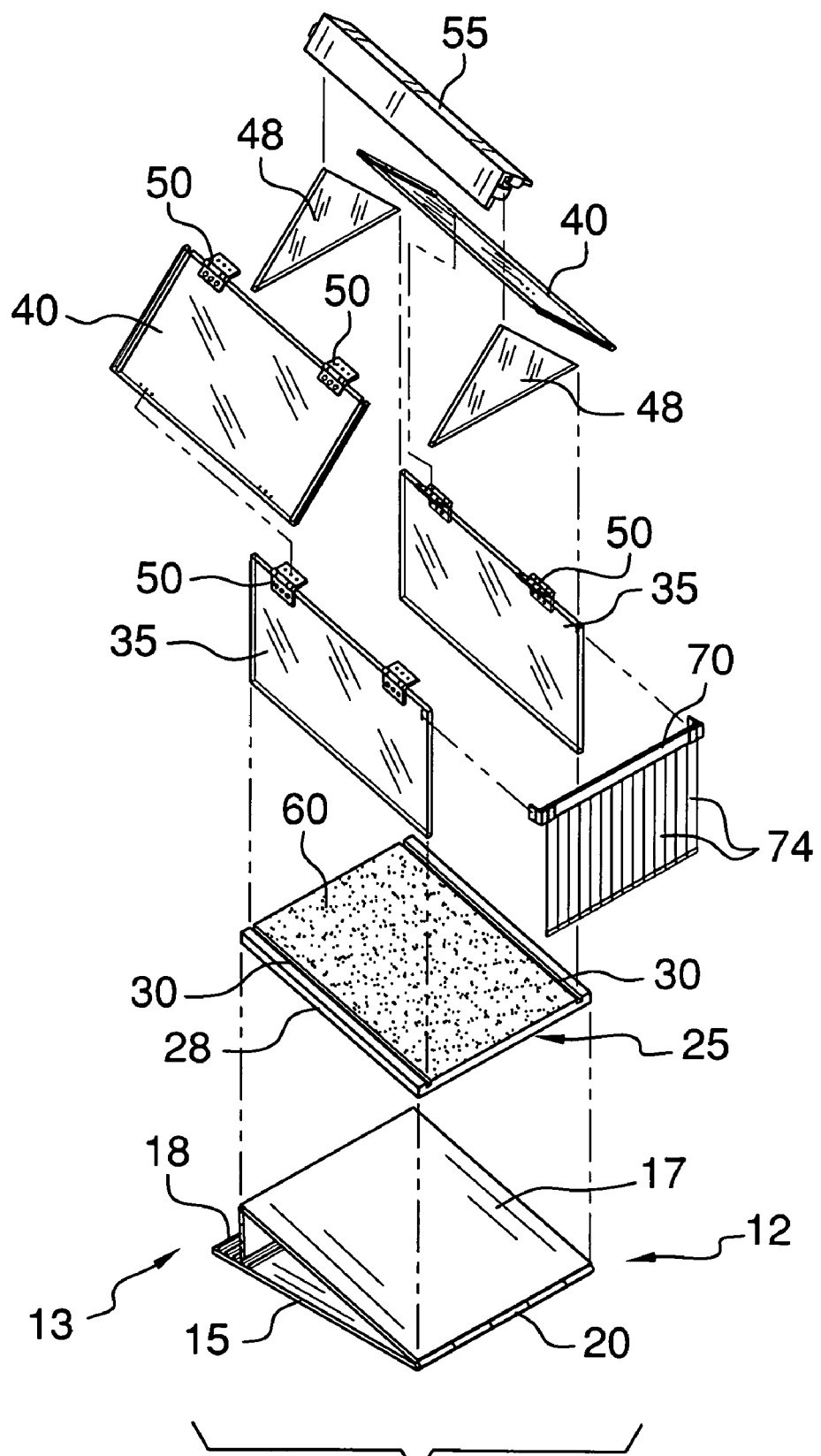
FIG. 2 is an exploded perspective view.
Figure 3:
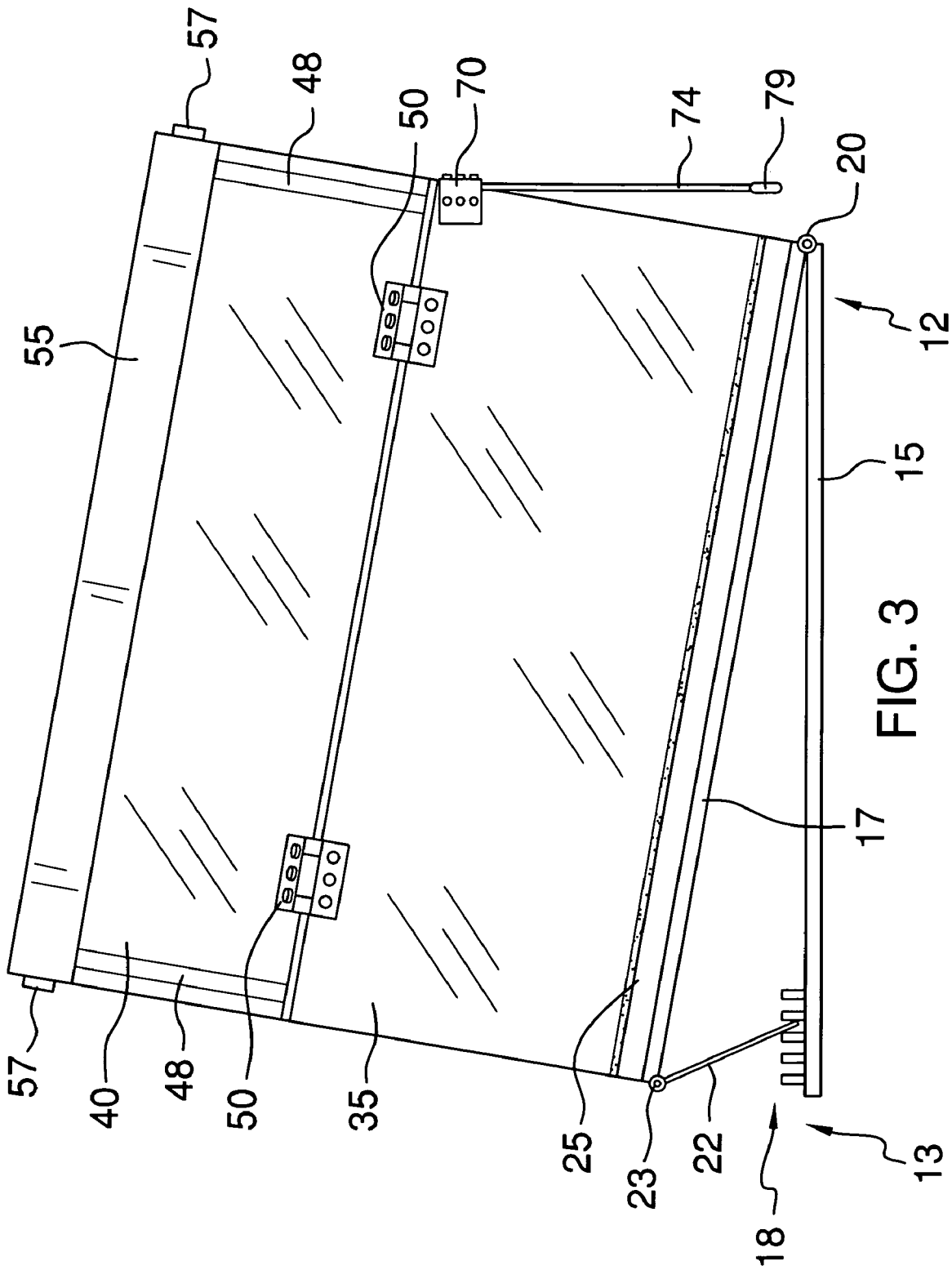
FIG. 3 is a lateral elevation view.

Continuing to refer to FIGS. 1 and 4, and also referring to FIGS. 2 and 3, the apparatus 10 further comprises the parallelepiped base 15 having a front end 36, a rear end 37, a right side 38, and a left side 39. An adjustment plate 17, having a first side 42 and a second side 43, is hingedly affixed to the front end 36 of the base 15 via a plate hinge 20. A plurality of teeth 18 is disposed horizontally across the base, between the right side 38 and the left side 39, adjacent to the rear end 37. A parallelepiped adjuster 22 is hingedly affixed to the second side 43 of the adjustment plate 17 via an adjuster hinge 23.

The adjuster 22 is selectively pivoted via the adjuster hinge 23 and fitted into the teeth 18, thereby selecting a height of the second side 43 of the adjustment plate 17, thereby aligning the apparatus 10 second end 13 with a chosen pet door 90. An interior floor 25 having a first floor side 26 and a second floor side 27 is fitted atop the adjustment plate 17. A comfort material 60 covers the top of the interior floor 25. The comfort material 60 may be carpet, other woven material, or some form of resilient material. A groove 30 continuously runs longitudinally along the first floor side 26 and the second floor side 27 of interior floor 25. A side panel 35 having a proximal end 65 and a distal end 66 is removably and vertically fitted within each groove 30. A roof panel 40 is hingedly attached to each of the side panels 35, respectively, via panel hinges 50. The roof panels 40 are hingedly attached to each other via panel hinges 50. The pair of opposed triangular roof end panels 48 are vertically fitted between the roof panels 40. The protective cap 55 is fitted atop the hinged attachment of the roof panels 40. The cap 55 further comprises tabs 57 for holding the roof panels 40 and the roof end panels 48 in position. The strip anchor 70 is selectively fitted to the proximal end 65 of each side panel 35. A plurality of flexible strips 74 is hung from the strip anchor 70. The strips 74 are not attached to each other. A weight 79 is disposed at each strip bottom end 78. The weights 79 act to maintain a breakable seal for resisting inclement weather, thereby sheltering a pet 80 and preventing weather invasion into the apparatus 10 and the pet door 90, while also allowing a e pet 80 to easily enter and exit through the flexible strips 74.

Figure 5:
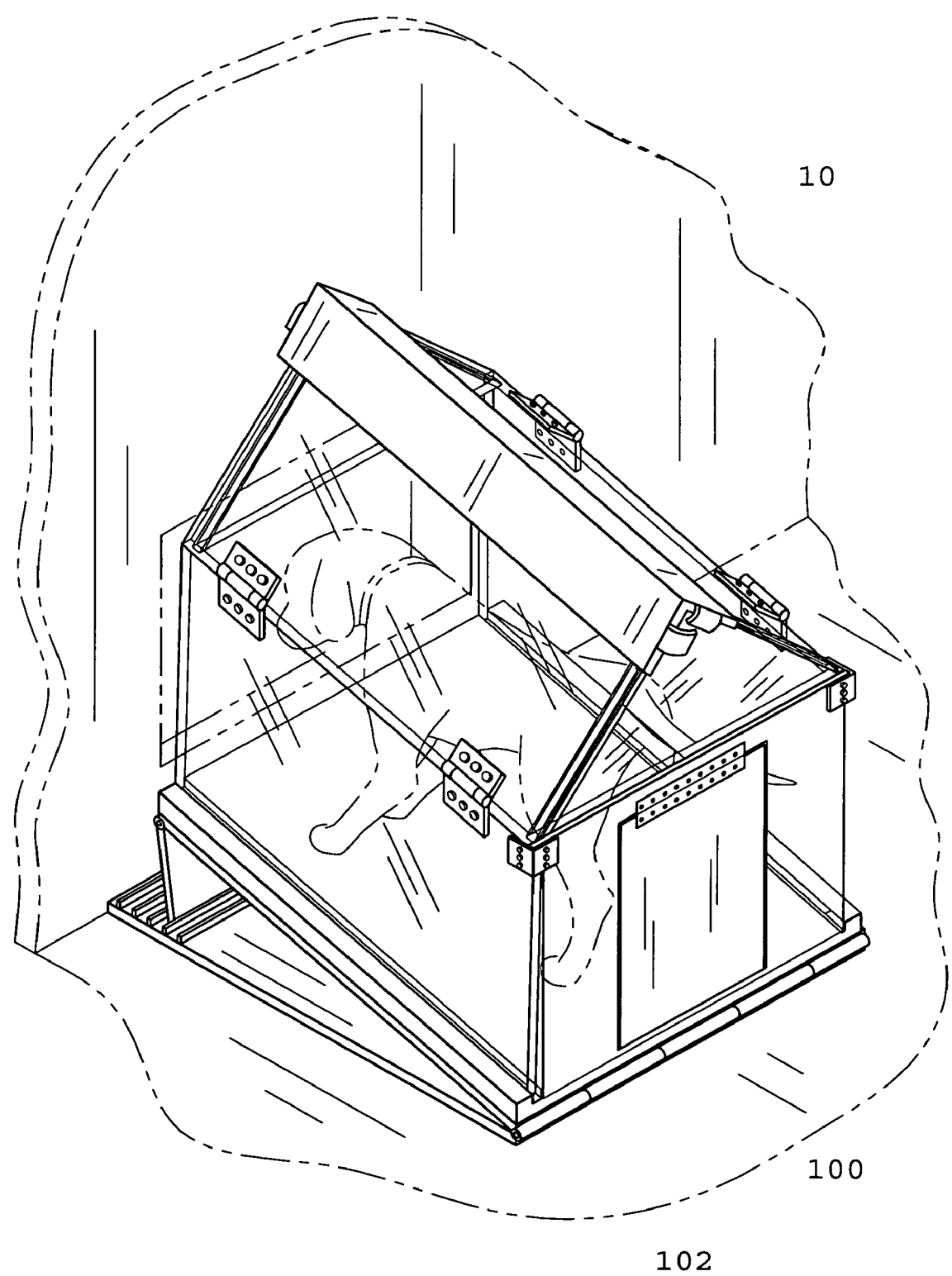
FIG. 5 is a perspective end view of an alternative embodiment illustrating a hingedly-affixed rectangular door.

Now referring to FIG. 5, an alternative embodiment of the present apparatus 10 is illustrated which provides a door 100 hingedly attached via a hinge assembly 102 to the first end of the apparatus 10 to allow a pet 80 to enter and exit the apparatus 10.

With respect to the above description then, it is to be realized that the optimum dimensional relationships for the parts of the pet door protection apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the pet door protection apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the pet door protection apparatus may be used.

Therefore, the foregoing is considered as illustrative only of the principles of the pet door protection apparatus. Further, since numerous modifications and changes will readily occur to those skilled in the art, it is not desired to limit the pet door protection apparatus to the exact construction and operation shown and described, and accordingly, all suitable modifications and equivalents may be resorted to, falling within the scope of the pet door protection apparatus.

What is claimed is:

1. A collapsible pet door protection apparatus for movable placement adjacent to an existing pet door, the apparatus having a first end and an open second end, the apparatus further comprising:
    a parallelepiped base having a front end, a rear end, a right side, and a left side;
    an adjustment plate, having a first side and a second side, hingedly affixed to the front end of the base;
    a plurality of teeth disposed horizontally across the base, between the right side and left side of the base, adjacent to the rear end of the base;
    an adjuster hingedly affixed to the second side of the adjustment plate, the adjuster selectively fitted into the teeth, whereby a height of the second side of the adjustment plate is adjusted;
    an interior floor having a first floor side and a second floor side, said interior floor placed atop the base;
    a groove continuously running longitudinally along the first floor side and the second floor side of said interior floor;
    a transparent side panel removably and vertically fitted within each groove;
    a pair of opposed roof panels attached to the side panels; said roof panels further hingedly attached to each other;
    a pair of opposed triangular roof end panels vertically fitted between the roof panels;
    a protective cap fitted atop the hinged attachment of the roof panels, the cap further comprising tabs adapted to hold the roof panels and the roof end panels in position;
    a strip anchor selectively fitted to the proximal end of each side panel; and
    a plurality of flexible strips, having a strip bottom end, said strips hung from the strip anchor.

2. The apparatus according to claim 1 wherein each strip further comprises a weight at each strip bottom end.

3. The apparatus according to claim 2 wherein each strip is further transparent.

4. The apparatus according to claim 1 wherein each strip is further transparent.

5. A collapsible pet door protection apparatus for movable placement adjacent to an existing pet door, the apparatus having a first end and an open second end, the apparatus further comprising:
    a parallelepiped base having a front end, a rear end, a right side, and a left side;
    an adjustment plate, having a first side and a second side, hingedly affixed to the front end of the base;
    a plurality of teeth disposed horizontally across the base, between the right side and left side of the base, adjacent to the rear end of the base;
    an adjuster hingedly affixed to the second side of the adjustment plate, the adjuster selectively fitted into the teeth, whereby a height of the second side of the adjustment plate is adjusted;
    an interior floor having a first floor side and a second floor side, said interior floor placed atop the base;
    a groove continuously running longitudinally along the first floor side and the second floor side of said interior floor;
    a transparent side panel removably and vertically fitted within each groove;
    a pair of opposed roof panels attached to the side panels; said roof panels further hingedly attached to each other;
    a pair of opposed triangular roof end panels vertically fitted between the roof panels;
    a protective cap fitted atop the hinged attachment of the roof panels, the cap further comprising tabs adapted to hold the roof panels and the roof end panels in position; and
    a door hingedly attached to the apparatus first end.

* * * * *